Patented July 18, 1950

2,515,961

UNITED STATES PATENT OFFICE 2,515,961

METHOD OF PRODUCING SILICA SOLS

Morris D. Marshall, Arlington, Mass., assignor to Monsanto Chemical Company, St. Louis, Mo., a corporation of Delaware No Drawing. Application September 29, 1947, Serial No. 776,858

11 Claims. (Cl. 252—313)

The present invention relates to improved methods of preparing aquasols, and more particularly to improved methods of preparing very stable aquasols containing high concentrations of an inorganic oxide as the discontinuous phase.

In accordance with the present invention, aquasols having improved stability at high concentrations of inorganic oxide are readily obtainable. Thus, for example, a very stable aquasol having a concentration of 25% and upwards of inorganic oxide are obtained in a simple, easily controlled and efficient manner.

One object of the present invention is to provide improved methods of preparing very stable and highly concentrated aquasols from acid reacting organo-aquasols.

A further object of the present invention is to prepare very stable and highly concentrated aquasols from acid reacting organo-aquasols by a simple, easily controlled and efficient method.

Still further objects and advantages of the invention will appear from the following description and appended claims.

The invention is carried out in general by first forming a suitable quantity of an acid reacting organo-aquasol having a pH of from 2.0 to 4.0 and containing an inorganic oxide, adding a minor, that is 20% or less, portion of such acid reacting sol to a dilute alkaline solution so as to form an alkaline reacting mix, simultaneously removing organic diluent from and adding the remainder of the acid reacting sol to the alkaline reacting mix at such a rate that the original quantity of organic diluent in the alkaline reacting mix is maintained substantially constant while maintaining the pH of the mix above 8.0, then removing substantially all of the organic diluent from the alkaline reacting mix, and finally removing a suitable quantity of water from the resulting aquasol.

Acid reacting organo-aquasols having a pH of from 2.0 to 4.0 and containing an inorganic oxide for use in accordance with the invention may be prepared in any suitable manner. In the case of silica sols, for example, they are preferably prepared by reacting an aqueous alkaline silicate, such as sodium silicate, and an inorganic acid as, for example, sulfuric acid in suitable proportions to provide a pH between 2.0 and 4.0. Any other suitable method may be employed, however, depending upon the particular inorganic oxide sol which it is desired to prepare. The resulting initial aquasols, which contain an inorganic oxide and a dissolved inorganic salt, are then treated with a water-miscible organic diluent as, for example, ethanol and in some cases also cooled to precipitate the inorganic salt, which is readily removed by any suitable method as, for example, by centrifuging, filtration, decantation and the like. Such methods are described more fully in U. S. Patent to Morris D. Marshall, Number 2,285,449 and U. S. Patent to John F. White, Number 2,285,477. Preferred acid reacting sols prepared by such methods are acid reacting ethanol-aquasols, acetone-aquasols, 2-propanol-aquasols and 2 - methyl - 2 - propanol - aquasols.

In a preferred embodiment of the invention, a suitable quantity of acid reacting organo-aquasols having a pH of from 2.0 to 4.0 and containing up to 10% of an inorganic oxide is prepared as given above and about 20% or less by weight and more preferably 10% or less by weight is added to a suitable quantity of a dilute alkaline aqueous solution, preferably comprising from 0.075 mol to 0.25 mol per liter of an alkaline compound or a mixture of alkaline compounds. This mix is then heated in a suitable manner until the organic diluent contained in the mix begins to distill off. The distillation is continued and the remainder of the acid reacting organo-aquasol is preferably continuously added to the mix and organic diluent is simultaneously removed from the mix by distillation. Such additions and removals are made at such a rate that the original quantity of organic diluent in the mix is maintained substantially constant. The quantity of dilute alkaline solution used should be in an amount sufficient with respect to the total quantity of acid reacting organo-aquasol added thereto so that the final pH of the distilland is above 8.0 and more preferably above 8.5. After the addition of acid reacting organo-aquasol is completed, it is preferable to remove substantially all of the remaining organic diluent contained in the mix by continuing the distillation. The resulting colloidal solution may be further concentrated, if desired, by removing a minor portion of water therefrom by any suitable method as, for example, by distillation, vacuum distillation, evaporation or the like.

Any suitable alkaline solution may be used in the above process and this alkaline solution may contain one or more alkaline compounds. As examples of such alkaline compounds may be mentioned LiOH, KOH, NaOH, CsOH, quaternary ammonium bases and the like. Preferred alkaline solutions for use according to the invention preferably contain either caustic soda or caustic potash or both.

A further understanding of the invention will be obtained from the following examples which are intended to be illustrative, but not limitative of the invention, parts and percentages being by weight unless otherwise specified.

*Example I*

An acid reacting organo-aquasol is prepared in the following manner:

Three hundred and eighty-seven parts of clear, filtered commercial sodium silicate containing 28.4% $SiO_2$ and 9.0% $Na_2O$ are diluted with 160.5 parts of water. This mixture is added with vigorous agitation to 164 parts of a 34% aqueous solution of sulfuric acid. The above mix is maintained at 10° C. during and after the silicate addition. Seven hundred and forty-seven parts of 190 proof ethanol are added to the above mixture which is maintained at 10° C. prior to and during the addition of ethanol. The sodium sulfate crystals so formed are removed by filtration. The resulting acid reacting ethanol-aquasol has a pH of about 3.0 and contains approximately 8.6% $SiO_2$, 0.5% $H_2SO_4$ and about 0.1% $Na_2SO_4$.

Ninety-two parts of the acid reacting ethanol-aquasol as prepared above are added with stirring to 643 parts of an alkaline solution comprising 0.1 mol per liter of NaOH. This mix is heated to boiling with continuous stirring in a distillation apparatus equipped with a fractionating column and a condenser. As soon as the constant boiling mixture begins to distill over, the balance of the ethanol-aquasol (1,072 parts) is added continuously to the boiling mix and ethanol-water constant boiling mix removed by distillation at atmospheric pressure at such a rate that the original quantity of ethanol in the mix is maintained substantially constant. As soon as the addition of acid reacting sol is completed, the remainder of the ethanol is removed by distillation through the column. The resulting aquasol is then boiled down without the use of a column to a concentration of about 21% $SiO_2$.

*Example II*

An acid reacting organo-aquasol is prepared in exactly the same manner as described in Example I except that 747 parts of acetone are substituted for 747 parts of 190 proof ethanol. The resulting acid reacting acetone aquasol has a pH of about 2.6 and contains approximately 8.6% $SiO_2$, 0.5% $H_2SO_4$ and about 0.1% $Na_2SO_4$.

Ninety-two parts of acid reacting acetone-aquasol as prepared above are added with stirring to 643 parts of a solution comprising 0.1 mol per liter of NaOH. This mix is heated to boiling with continuous stirring in a distillation apparatus equipped with a condenser. As soon as the acetone begins to distill over, the balance of acetone-aquasol (1,072 parts) is continuously added to the boiling mix and acetone removed by distillation at atmospheric pressure at such a rate that the original quantity of acetone in the mix remains substantially constant. As soon as the addition of acetone-aquasol is completed, the remainder of the acetone is removed from the mix by distillation. The resulting aquasol is then boiled down without the use of a condenser to a concentration of about 21% $SiO_2$.

*Example III*

Two thousand three hundred and twenty-eight parts of an acid reacting ethanol-aquasol containing silica are prepared in accordance with the procedure described in Example I.

Ninety-two parts of the above ethanol-aquasol are added with stirring to 643 parts of an aqueous solution containing 0.2 mol per liter NaOH by weight. This mix is heated and the remainder of the above ethanol-aquasol (2236 parts) is added thereto and ethanol water (C. B. M.) is removed in exactly the same manner and according to the procedure described in Example I. As soon as the addition of ethanol-aquasol is completed the remainder of the ethanol is removed by distillation. The resulting aquasol is then boiled down to a concentration of about 21% $SiO_2$.

*Example IV*

Two thousand three hundred and twenty-eight parts of an acid reacting acetone-aquasol containing silica are prepared in the same manner as described in Example II.

Ninety-two parts of the above acetone-aquasol are added with stirring to 643 parts of an aqueous solution containing 0.2 mol per liter of NaOH by weight. This mix is heated and the remainder of the above acid reacting acetone-aquasol (2236 parts) is added to the mix and acetone removed in exactly the same manner and according to the procedure described in Example II. As soon as the addition of acetone-aquasol is completed, the remainder of the acetone is removed by distillation and the resulting aquasol is then boiled down to a concentration of 21% $SiO_2$.

The aquasols prepared according to the foregoing examples are exceedingly stable, that is they are stable for periods of up to 12 months or longer. In addition, they contain a very low concentration of caustic soda, for example, about 0.03 mol of NaOH to 1 mol of $SiO_2$ and have a pH of from about 9.2 to 9.6. Moreover, such aquasols may be diluted with water so as to contain 0.1% or less $SiO_2$ by weight, and may, on the other hand, be further concentrated so as to contain 25% or more $SiO_2$.

Aquasols prepared in accordance with the invention have a wide variety of applications, as for example, in imparting to textiles and paper a slip resistant finish, as agents for improving the strength of cotton yarns, paper and the like.

What is claimed is:

1. The method of preparing a stable aquasol containing silica which comprises adding a minor portion of an acid reacting organo-aquasol containing silica to a dilute alkaline solution comprising about 0.075 to 0.25 mol of alkaline compound per liter of said solution, continuously adding the remainder of said acid reacting sol to the resulting mix and simultaneously removing organic diluent by distillation at such a rate that the original quantity of organic diluent in said mix is maintained substantially constant, the total quantity of acid reacting sol added being insufficient to neutralize said alkaline solution, and removing substantially all organic diluent from the resulting colloidal solution.

2. The method of preparing a stable aquasol containing high concentrations of silica which comprises adding a minor portion of an acid reacting organo-aquasol having a pH of from 2.0 to 4.0 and containing up to 10% silica to an alkaline solution comprising about 0.075 to 0.25 mol per liter of alkaline compound, continuously adding the remainder of said acid reacting sol to the resulting mix and simultaneously removing organic diluent by distillation at such a rate that the original quantity of organic diluent in said mix is maintained substantially constant while maintaining the pH of the colloidal solution so formed above 8.5 and removing substantially all of the organic diluent and a minor portion of water from the resulting colloidal solution.

3. The method of preparing a stable aquasol containing high concentrations of silica which comprises adding a portion of an acid reacting ethanol-aquasol having a pH of from 2.0 to 4.0 and containing up to 10% silica to an alkaline solution comprising about 0.075 to 0.25 mol per liter of alkaline compound, adding the remainder of said acid reacting ethanol-aquasol to the resulting mix and simultaneously removing ethanol by distillation at such a rate that the original quantity of ethanol in the mix is maintained substantially constant, the total quantity of acid reacting sol added being insufficient to lower the pH of said alkaline solution below 8.5, and removing substantially all of the ethanol and a minor portion of water from the resulting colloidal solution.

4. The method of preparing a stable aquasol containing high concentrations of silica which comprises adding a portion of an acid reacting acetone-aquasol having a pH of 2.0 to 4.0 and containing up to 10% silica to an alkaline solution comprising about 0.075 to 0.25 mol per liter of alkaline compound, adding the remainder of said acid reacting acetone-aquasol to the resulting mix and simultaneously removing acetone by distillation at such a rate that the original quantity of acetone in the mix is maintained substantially constant, the total quantity of acid reacting sol added being insufficient to lower the pH of said alkaline solution below 8.5, and removing substantially all of the acetone and a minor portion of water from the resulting colloidal solution.

5. The method of preparing a stable aquasol containing silica which comprises adding a portion of an acid reacting 2-propanol-aquasol having a pH of from 2.0 to 4.0 and containing up to 10% silica to an alkaline solution comprising about 0.075 to 0.25 mols per liter of alkaline compound, adding the remainder of said acid reacting 2-propanol-aquasol to the resulting mix and simultaneously removing 2-propanol by distillation at such a rate that the original quantity of 2-propanol in the mix is maintained substantially constant, the total quantity of acid reacting sol added being insufficient to lower the pH of said alkaline solution below 8.5 and removing substantially all of the 2-propanol and a minor portion of water from the resulting colloidal solution.

6. The method of preparing a stable aquasol containing silica which comprises adding a minor portion of an acid reacting organo-aquasol having a pH of from 2.0 to 4.0 and containing silica to a dilute alkaline solution comprising about 0.075 to 0.25 mol of alkaline compound per liter of said solution, continuously adding the remainder of said acid reacting sol to the resulting mix and simultaneously removing organic diluent by distillation at such a rate that the original quantity of organic diluent in said mix is maintained substantially constant, to total quantity of acid reacting sol added being insufficient to lower the pH of said alkaline solution below 8.0, and removing substantially all organic diluent from the resulting colloidal solution.

7. A method substantially according to claim 6, but further characterized in that the alkaline compound is NaOH.

8. A method substantially according to claim 2, but further characterized in that the alkaline compound is NaOH.

9. A method substantially according to claim 3, but further characterized in that the alkaline compound is NaOH.

10. A method substantially according to claim 4, but further characterized in that the alkaline compound is NaOH.

11. A method substantially according to claim 5, but further characterized in that the alkaline compound is NaOH.

MORRIS D. MARSHALL.

REFERENCES CITED

The following references are of record in the file of this patent:

UNITED STATES PATENTS

| Number | Name | Date |
|---|---|---|
| 2,285,449 | Marshall | June 9, 1942 |
| 2,285,477 | White | June 9, 1942 |
| 2,377,842 | Marshall | June 5, 1945 |
| 2,386,247 | Marshall | Oct. 9, 1945 |
| 2,391,253 | Marshall | Dec. 18, 1945 |
| 2,391,255 | Marshall | Dec. 18, 1945 |

Certificate of Correction

July 18, 1950

Patent No. 2,515,961

MORRIS D. MARSHALL

It is hereby certified that error appears in the printed specification of the above numbered patent requiring correction as follows:

Column 6, line 19, for the words "to total" read *the total*; and that the said Letters Patent should be read as corrected above, so that the same may conform to the record of the case in the Patent Office.

Signed and sealed this 13th day of March, A. D. 1951.

[SEAL]

THOMAS F. MURPHY,
*Assistant Commissioner of Patents.*